(12) United States Patent
Feldman et al.

(10) Patent No.: US 10,481,660 B1
(45) Date of Patent: Nov. 19, 2019

(54) BATTERYLESS DATA LOGGER WITH BACKUP STATUS INDICATION AND METHOD THEREFOR

(71) Applicants: Michael Feldman, Thornhill (CA); Boris Feldman, Thornhill (CA)

(72) Inventors: Michael Feldman, Thornhill (CA); Boris Feldman, Thornhill (CA)

( * ) Notice: Subject to any disclaimer, the term of this patent is extended or adjusted under 35 U.S.C. 154(b) by 0 days.

(21) Appl. No.: 16/394,321

(22) Filed: Apr. 25, 2019

(51) Int. Cl.
| | | |
|---|---|---|
| *G06F 1/26* | (2006.01) | |
| *H02J 7/00* | (2006.01) | |
| *G06F 13/16* | (2006.01) | |
| *G06F 3/06* | (2006.01) | |
| *H02J 7/34* | (2006.01) | |

(52) U.S. Cl.
CPC .............. *G06F 1/266* (2013.01); *G06F 3/065* (2013.01); *G06F 3/0619* (2013.01); *G06F 3/0673* (2013.01); *G06F 13/1668* (2013.01); *H02J 7/0021* (2013.01); *H02J 7/345* (2013.01)

(58) Field of Classification Search
None
See application file for complete search history.

(56) References Cited

U.S. PATENT DOCUMENTS

| | | | |
|---|---|---|---|
| 5,761,084 A | * | 6/1998 | Edwards .................. G06F 1/263 307/23 |
| 6,496,939 B2 | | 12/2002 | Portman et al. |
| 7,908,504 B2 | | 3/2011 | Feldman et al. |
| 8,161,310 B2 | | 4/2012 | Cagno et al. |
| 2006/0080515 A1 | | 4/2006 | Spiers et al. |
| 2009/0254772 A1 | | 10/2009 | Cagno et al. |
| 2010/0318844 A1 | * | 12/2010 | Matsuda ............. G06F 11/0727 714/6.12 |
| 2011/0027626 A1 | * | 2/2011 | Lattin .................. H01M 10/441 429/50 |
| 2011/0227416 A1 | | 9/2011 | Lecourtier |

* cited by examiner

*Primary Examiner* — Paul Yen
(74) *Attorney, Agent, or Firm* — Bereskin & Parr LLP/S.E.N.C.R.L., s.r.l.

(57) ABSTRACT

Data storage device has a super-capacitor, a control unit with multiple operational states, non-volatile memory, and a bus connected to a computing device with a separate power source. The control unit state is set by the power level of the computing device and the super-capacitor. In a backup state, the control unit stores backup data from the computing device in the non-volatile memory using power from the super-capacitor. In an inactive state, the control unit does not receive power from the super-capacitor. The control unit is set to the backup state when the device power level is less than a first threshold and the super-capacitor voltage level is greater than a second threshold. The control unit is set to the inactive state when the super-capacitor voltage level decreases below a third threshold that is less than the second threshold by more than the dielectric absorption voltage gain of the super-capacitor.

25 Claims, 5 Drawing Sheets

BATTERYLESS DATA LOGGER WITH BACKUP STATUS INDICATION AND METHOD THEREFOR

FIELD

This specification relates generally to data backup systems, and in particular to data backup systems with a separate power supply.

INTRODUCTION

The following is not an admission that anything discussed below is part of the prior art or part of the common general knowledge of a person skilled in the art.

An important consideration in the design of an electronic system is the system operation following a power off event, in particular an unplanned power outage. Unplanned power outages can occur for many different reasons, including as the result of an operational failure or the removal of the power supply to the electronic system. Depending on the reason for the power outage, it may or may not be safe to re-initialize the electronic system or to connect an external device to the system to access data stored on the system.

Some electronic systems include data storage devices such as hard drives or flash cards that can be used to store diagnostic or status information during system operation and in case of power failure. However, some embedded systems such as set-top boxes, may not include such data storage devices for reasons of cost, size, complexity etc. In such systems, diagnostic and status information may be stored in random access memory (RAM) during operation (i.e. when system power is active), and then lost in the event of a power failure. Such systems may use an external backup device that stores diagnostic and status information in non-volatile memory.

U.S. Pat. No. 7,908,504 to Feldman discloses a smart batteryless backup device designed to receive data transmitted by controlled equipment, back up the data in the case of a power failure of the controlled equipment or in accordance with several program requirements, and also to provide subsequent restoration.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one aspect of this disclosure, in a broad aspect there is provided a data storage device usable with a computing device that is powerable by a power source. The data storage device can include a non-volatile memory and separate power source with at least one super-capacitor. This may provide an increased lifespan and reduce the frequency of maintenance required for the data storage device. The data storage device can store data from the computing device in the non-volatile memory using power from the at least one super-capacitor, for instance in the event of a power failure. The discharge of power from the super-capacitor may be controlled so that the at least one super-capacitor can be used to output data from the data storage device, even after backup operations are complete.

In accordance with this broad aspect, there is provided a data storage device for a computing device, the computing device being powerable by a power source, the data storage device including: at least one super-capacitor; a data backup unit including: a data control unit coupled to the at least one super-capacitor, where the data control unit is adjustable between a plurality of operational states, and the plurality of operational states include a backup state and an inactive state; and a non-volatile memory coupled to the data control unit; an interface bus coupled to the data backup unit, where the interface bus is connectable to the computing device, where the power source of the computing device is separate from the at least one super-capacitor; and a state control unit coupled to the at least one super-capacitor, to the data control unit, and to the interface bus, where the state control unit is operable to monitor a stored voltage level of the at least one super-capacitor, where when the interface bus is connected to the computing device the state control unit is operable to monitor a device power level of the computing device by monitoring a received power level from the interface bus, and the state control unit is operable to control the operational state of the data control unit based on the stored voltage level and the device power level; where in the backup state, the data control unit is operable to store backup data in the non-volatile memory using power from the at least one super-capacitor, where the backup data is received from the computing device via the interface bus when the interface bus is connected to the computing device; the state control unit is configured to set the operational state of the data control unit as the backup state in response to determining that the device power level is less than a power off threshold and that the stored voltage level is greater than a backup voltage threshold; the state control unit is configured to adjust the operational state of the data control unit from the backup state to the inactive state in response to determining that the stored voltage level is less than a low voltage threshold, where the low voltage threshold is less than the backup voltage threshold by a predefined voltage difference, and the predefined voltage difference is defined to be greater than the voltage gain of the at least one super-capacitor due to dielectric absorption when the stored voltage level is equal to the low voltage threshold and the at least one super-capacitor is decoupled from a load; and in the inactive state, the data control unit does not receive power from the at least one super-capacitor.

In some embodiments, the data storage device can also include an output unit coupled to the data control unit; where the data control unit is operable in an output state; in the output state, the data control unit is operable to transmit output data to the output unit using power from the at least one super-capacitor, where the output data is defined using the backup data stored in the non-volatile memory; and the state control unit is configured to: receive an output activation signal while the data control unit is in the inactive state; and change the operational state of the data control unit from the inactive state to the output state in response to receiving the output activation signal.

In some embodiments, the output unit includes an external interface port and the external interface port is connectable to a corresponding data transmission connector.

In some embodiments, the external interface port is configured according to a defined communication protocol; the defined communication protocol omits a dedicated power supply line; and the data control unit is configured to transmit the backup data through the external interface port using power from the at least one super-capacitor.

In some embodiments, the output unit includes an output display; and the data control unit is configured to display the output data on the output display using power supplied by the at least one super-capacitor.

In some embodiments, the data storage device can include a user input interface, where the user input interface is operable to: receive a data output user input; and transmit the output activation signal to the state control unit in response to receiving the data output user input.

In some embodiments, the data control unit is operable in a data logging state; and when the interface bus is connected to the computing device the state control unit is configured to change the operational state of the data control unit to the data logging state in response to determining that the device power level is greater than the power off threshold; and in the data logging state, the data control unit is operable to receive the backup data from the computing device via the interface bus and to monitor the received backup data.

In some embodiments, when the interface bus is connected to the computing device the state control unit is configured to change the operational state of the data control unit to the data logging state in response to determining that the device power level is greater than the power off threshold and stored voltage level is greater than backup voltage threshold.

In some embodiments, the data control unit is powered by the at least one super-capacitor in the data logging state.

In some embodiments, the predefined voltage difference is at least 20% of the low voltage threshold.

In some embodiments, the backup voltage threshold is fixed and the low voltage threshold is fixed.

In some embodiments, the backup voltage threshold is fixed.

In some embodiments, when the interface bus is connected to the computing device, the at least one super-capacitor is chargeable using power from the power source.

In accordance with a broad aspect of this disclosure, there is also provided a data backup system including: a computing device including: a processor; a device memory coupled to the processor; and a device power supply, where the processor operates using power from the device power supply; and a data storage device including: at least one super-capacitor; a data backup unit including: a data control unit coupled to the at least one super-capacitor, where the data control unit is adjustable between a plurality of operational states, and the plurality of operational states include a backup state and an inactive state; and a non-volatile memory coupled to the data control unit; an interface bus coupled to the data backup unit and to the computing device; and a state control unit coupled to the at least one super-capacitor, to the data control unit, and to the interface bus, where the state control unit is operable to monitor a stored voltage level of the at least one super-capacitor, the state control unit is operable to monitor a device power level of the computing device by monitoring a received power level from the interface bus, and the state control unit is operable to control the operational state of the data control unit based on the stored voltage level and the device power level; where in the backup state, the data control unit is operable to store backup data in the non-volatile memory using power from the at least one super-capacitor, where the backup data is received from the computing device via the interface bus when the interface bus is connected to the computing device; the state control unit is configured to set the operational state of the data control unit as the backup state in response to determining that the device power level is less than a power off threshold and that the stored voltage level is greater than a backup voltage threshold; the state control unit is configured to adjust the operational state of the data control unit from the backup state to the inactive state in response to determining that the stored voltage level is less than a low voltage threshold, where the low voltage threshold is less than the backup voltage threshold by a predefined voltage difference, and the predefined voltage difference is defined to be greater than the voltage gain of the at least one super-capacitor due to dielectric absorption when the stored voltage level is equal to the low voltage threshold and the at least one super-capacitor is decoupled from a load; in the inactive state, the data control unit does not receive power from the at least one super-capacitor.

In some embodiments, the data storage device can include an output unit coupled to the data control unit; where the data control unit is operable in an output state; in the output state, the data control unit is operable to transmit output data to the output unit using power from the at least one super-capacitor, where the output data is defined using the backup data stored in the non-volatile memory; and the state control unit is configured to change the operational state of the data control unit from the inactive state to the output state in response to receiving an output activation signal.

In accordance with a broad aspect of this disclosure, there is provided a method of backing up data for a computing device that operates using power from a device power supply, the method performed by a data storage device, where the data storage device includes at least one super-capacitor, a data control unit coupled to the at least one super-capacitor and a non-volatile memory coupled to the data control unit, and where the data storage device is connected to the computing device, the method including: monitoring a device power level of the computing device; monitoring a stored voltage level of the at least one super-capacitor; if: (i) the device power level is less than a power off threshold, and (ii) the stored voltage level is greater than a backup voltage threshold, then operating the data control unit using power from the at least one super-capacitor to store backup data in the non-volatile memory, where the backup data is received from the computing device; if: (i) the stored voltage level is less than a low voltage threshold, where the low voltage threshold is less than the backup voltage threshold by a predefined voltage difference, and (ii) the predefined voltage difference is greater than the voltage gain of the at least one super-capacitor due to dielectric absorption when the stored voltage level is equal to the low voltage threshold and the at least one super-capacitor is decoupled from a load, then disabling power supply from the at least one super-capacitor to the data control unit.

In some embodiments, the method can include receiving an output activation signal while supplying power from the at least one super-capacitor to the data control unit is disabled; and in response to receiving the output activation signal: enabling supplying power from the at least one super-capacitor to the data control unit; and operating the data control unit to transmit output data to an output unit, where the output data is defined using the backup data stored in the non-volatile memory.

In some embodiments, receiving the output activation signal includes receiving a data output user input from a user input interface on the data storage device.

In some embodiments, the output unit includes an external interface port and the external interface port is connectable to a corresponding data transmission connector; the external interface port is configured according to a defined communication protocol, and the defined communication protocol omits a dedicated power supply line; and transmitting the output data through the external interface port to the corresponding data transmission connector is powered by the at least one super-capacitor.

In some embodiments, transmitting the output data includes: displaying the output data on an output display of the data storage device using power from the at least one super-capacitor.

In some embodiments, the method can include identifying a logging state transition by determining when the device power level is greater than the power off threshold; and in response to identifying the logging state transition, operating the data control unit to monitor backup data received from the computing device.

In some embodiments, identifying the logging state transition includes determining when the device power level is greater than the power off threshold and stored voltage level is greater than backup voltage threshold.

In some embodiments, the data control unit is powered by the at least one super-capacitor while monitoring the backup data.

In some embodiments, the predefined voltage difference is at least 20% of the low voltage threshold.

In some embodiments, the backup voltage threshold is fixed and the low voltage threshold is fixed.

In some embodiments, the backup voltage threshold is fixed.

In some embodiments, the method can include when the device power level is greater than the power off threshold, charging the at least one super-capacitor using power from the device power supply.

It will be appreciated that the aspects and embodiments may be used in any combination or sub-combination.

DRAWINGS

The drawings included herewith are for illustrating various examples of articles, methods, and apparatuses of the teaching of the present specification and are not intended to limit the scope of what is taught in any way.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

During the operation of an electronic system, it can be important to store operational status data and diagnostic data in non-volatile memory. In particular, operational status data and diagnostic data may be backed-up in non-volatile memory to allow the data to be accessed in the event of a power failure. Access to the diagnostic data and operational status data may be necessary in order to determine why the power failure occurred and/or to determine whether the electronic system is able to return to normal operation once power is restored.

Many electronic systems include non-volatile storage devices such as hard drives, flash cards, etc. These non-volatile storage devices can be used to store diagnostic or status information during electronic system operation and in case of power failure. However, depending on the cause of the power failure it may not be possible or safe to access the data stored within the electronic system.

There are also some electronic systems that do not have non-volatile storage units that can be used to store diagnostic and/or system status data. For example, some embedded systems with cost and/or size restrictions, such as "set-up boxes", do not have hard drives or writable flash to store diagnostic or status information. In such systems, diagnostic and status information is usually stored in volatile memory (e.g. SRAM) during system operation and will be lost after a power failure.

In embodiments described herein, a data storage device is provided that can be configured to provide backup functionality for electronic systems having one or more computing devices. In some embodiments, such a data storage device may be used with electronic systems that do not include non-volatile storage for diagnostic and/or status data. Alternately, or in addition, such data storage devices may be used to provide backup and/or redundant backup functionality for electronic systems that have non-volatile storage.

The data storage device can include a power supply that is separate from the power supply used by the electronic system. The data storage device can also include a non-volatile storage memory. The data storage device can be configured to use its separate power supply to store diagnostic data and storage data in the non-volatile storage memory.

In embodiments described herein, the power supply of the data storage device can include one or more super-capacitors (also referred to as an ultracapacitor or Goldcap™). As compared to an electrolytic capacitor, super-capacitors have dramatically higher energy density (per unit mass and per unit volume). Types of super-capacitors include electrostatic double-layer capacitors (EDLCs), electrochemical pseudo-capacitors, and hybrid capacitors that store charge both electrostatically and electrochemically. As compared to traditional batteries (e.g. lithium-ion batteries) super-capacitors may have shorter discharge and/or recharge times.

Using one or more super-capacitors for the power supply of the data storage device may provide advantages as compared to data storage devices that use more traditional power supplies such as batteries and/or accumulators. For example, the super-capacitors may provide advantages in terms of size, weight and cost for the data storage device. Super-capacitors may also have a longer lifespan than batteries/accumulators and may allow the data storage device to operate for long periods of time (e.g. 10-12 years with more than 500,000 charge/discharge cycles) with little or no maintenance.

However, super-capacitors also introduce electrical effects that do not occur with other energy storage components such as batteries, accumulators or standard capacitors. When super-capacitor discharge is interrupted, the super-capacitor may regain voltage in a process referred to as dielectric absorption. The amount of voltage regained by the super-capacitor may be referred to as the dielectric absorption voltage. In some cases, this dielectric absorption voltage may be greater than 15-20% of the super-capacitor voltage at the time discharge is interrupted. Data storage devices in accordance with the embodiments described herein may provide power control circuitry configured to account for the dielectric absorption of the one or more super-capacitors.

In some cases, it may be important to access the back-up data without restoring power to the electronic system. For example, a power failure may occur due to a fault in the electronic system that may cause further damage if power is restored prematurely. Accordingly, it may be necessary to analyze the system data and/or diagnostic data before restoring power to the electronic system.

In embodiments described herein, the data storage device may be configured to output data based on the storage diagnostic and/or status data without requiring power to be restored to the primary electronic system. For example, the data storage device may monitor the discharge of power from the one or more super-capacitors to ensure that sufficient power is retained in the super-capacitors to output data from the non-volatile memory of the data storage device.

In some cases, an electronic system may include an internal diagnostic visualization unit. However, the diagnostic unit may be contained within a secured housing of the electronic system. It may be difficult or dangerous for a user to access the diagnostic block, which may complicate the process of analyzing the diagnostic data to determine what, if any, repairs are required. Additionally, the electronic system and/or diagnostic visualization unit may not operate when the housing is detached (at least without specialized tools or equipment). A user may thus be required to return their computing device to the manufacturer in order to determine the cause of the failure.

In embodiments described herein, the data storage device can include an output unit. The data storage device can be configured to output data from the non-volatile memory via the output unit. For example, the output unit may include an external interface that can be connected to an assessment device, e.g. using a communication cable. Alternately or in addition, the output unit may include an output display operable to provide a user with a visual indication of the stored data, e.g. using a liquid-crystal display (LCD) and/or light-emitting diodes (LEDs).

The output unit may provide a user with access to the diagnostic and/or status data without requiring direct access to the interior of the electronic system. This may ensure that a user can access the backup data safely and easily.

Figure 1:
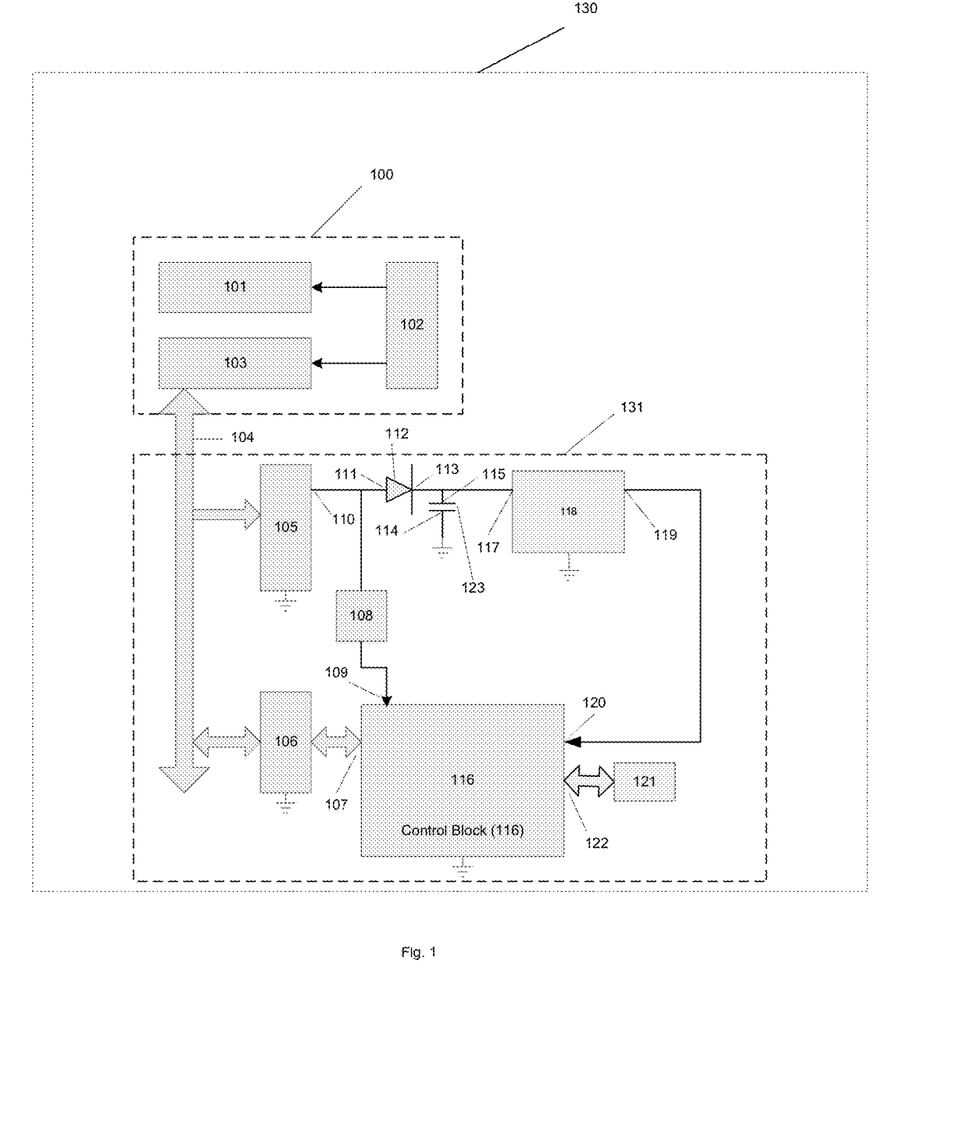
FIG. 1 is a block diagram illustrating an example of a data backup system in accordance with an embodiment.

Referring now to FIG. 1, shown therein is a block diagram illustrating an example of a computerized system 130. The computerized system 130 includes an electronic system 100 that includes at least one computing device. The computing device 100 can include a processor 101, a device memory (not shown) coupled to the processor 101, and a device power supply 102 (also referred to as a main power source). The electronic system 100 can be configured to operate the processor 101 using power from the device power supply 102.

The processor 101 may be any suitable processor, controller or digital signal processor that can provide sufficient processing power depending on the configuration and operational requirements of the electronic system 100. For example, the processor 101 may be a high performance processor. In alternative embodiments, the processor 101 may include more than one processor with each processor being configured to perform different dedicated tasks. In alternative embodiments, the processor 101 can include specialized hardware to provide some of the functions of the electronic system 100.

The device memory can include at least one data storage element. The at least one data storage element can include volatile and/or non-volatile memory and/or storage elements. Examples of data storage elements can include RAM, ROM, one or more hard drives, one or more flash drives or some other suitable data storage elements such as disk drives, etc. In some embodiments, the electronic system 100 may include only volatile memory and omit non-volatile memory elements.

The computerized system 130 also includes a data storage device 131. In some examples, data storage device 131 may also be referred to as a logger or a batteryless data logger. The data storage device 131 can be coupled to the electronic system 100 using an external interface bus 104. The external interface bus 104 can connect data storage device 131 to an interface port 103 of the electronic system 100.

The external interface bus 104 can be any interface that allows the data storage device 131 to communicate with the electronic system 100. In some embodiments, the external interface bus 104 may include at least one of a serial bus or a parallel bus, and a corresponding port such as a parallel port, a serial port or a USB port that provides USB connectivity. The busses may be external and/or internal. The busses may be at least one of a SCSI, USB, IEEE 1394 interface (FireWire), Parallel ATA, Serial ATA, PCIe, or InfiniBand. Other communication protocols may be used by the bus 104 in other embodiments. The data storage device 131 may use the bus 104 to connect to the electronic system 100, either directly or through a modem, router, switch, hub or other routing or translation device.

In some embodiments, the external interface bus 104 may be detachably attachable to the computing device 100. For example, the external interface bus 104 may include a connector that is detachably attachable to the interface port 103. The external interface bus 104 may be connected to the interface port 103 when the data storage device 131 is installed for use with the computing device.

Alternately, the external interface bus 104 may be fixedly connected to the interface port 103. For example, the data storage device 131 and computing device 100 may be provided as a combined data backup system.

The data storage device 131 has an energy storage module that includes at least one super-capacitor 123. In the discussion herein, the at least one super-capacitor 123 may be referred to as a super-capacitor for simplicity, however it should be understood that such references to the super-capacitor 123 may include one or more super-capacitors. As shown, the super-capacitor 123 includes a positive terminal 115 that is ungrounded and a negative terminal 114 that is grounded.

The data storage device 131 also includes a control unit 116 that can include a data control unit and at least one non-volatile data storage element (not shown) coupled to the data control unit. The at least one super-capacitor 123 can provide power to the control unit 116 to allow the components of control unit 116 (such as the data control unit) to operate.

In some embodiments, the control unit 116 (or at least the data control unit) may be powered solely by the at least one super-capacitor 123. This may ensure that operation of the control unit 116 is not unexpectedly interrupted in the event of a power failure of the main power supply 102.

In some embodiments, the main power supply 102 may be coupled to the data control unit (e.g. control unit 116) via the same power control unit as the super-capacitor 123. This may allow the main power supply 102 to power the control unit 116 while active, while also ensuring that the control unit 116 continues to receive power (at least initially) if the main power supply 102 is no longer active.

Alternately, the data storage device 131 may be configured to provide power from the main power supply 102 to the data control unit (e.g. control unit 116), without first passing through the power control unit associated with the at-least one super-capacitor 123. For example, the data storage device 131 may include a switch configured to couple the super-capacitor 123 to the control unit 116 automatically when the main power supply 102 is no longer active. This may facilitate more rapid recharging of the super-capacitor 123.

The main power supply 102 can supply power to computing device 100 and external interface bus 104. In some embodiments, the main power supply 102 can also supply power to the data storage device 131, for instance where the data storage device 131 does not have a separate external power supply.

In some embodiments, the external interface bus 104 may include dedicated power transmission lines in order to transmit power from the power supply 102 to the data storage device 131. Alternatively, the external interface bus 104 may only include logical signal transmission lines. The external interface bus 104 may be configured to transmit power from the main power supply 102 to the data storage device 131 using one or more of the logical signal transmission lines.

For example, the external interface bus 104 may be configured as an RS-232 interface. The RTS and DTR lines of the RS-232 interface may then be used to transmit power from the computing device 100 (i.e. from main power supply 102) to data storage device 131.

The non-volatile data storage elements of the data storage device 131 may include FLASH, electrically erasable programmable read-only memory (EEPROM), solid-state drives (SSD), one or more hard drives, one or more flash drives, or other data storage elements that can retain stored information even after being power cycled.

The control unit 116 may include any suitable processor, controller or digital signal processor that can provide sufficient processing power depending on the configuration and operational requirements of the data storage device 131. For example, the control unit 116 can include specialized hardware to provide some of the functions of the data storage device 131.

In the example shown in FIG. 1, a microcontroller can be used to implement the control unit 116. In some embodiments, the microcontroller can include operating elements configured to implement the data control unit as well as components of the state control unit of the data storage device 131. Alternately, the data control unit may be provided using separate hardware from logical control components of the state control unit.

The microcontroller can be configured to control the operations of the data storage device 131. The non-volatile data storage element, such as a flash memory chip, coupled to the data control unit may also be provided by the microcontroller. The flash memory may be used to store system diagnostic and/or status data from the electronic system 100 in the event that power is removed from the electronic system 100.

In the example shown in FIG. 1, the data storage device 131 includes a power conversion unit 105. The input of the power conversion unit 105 can be connected to one or more lines of the external interface bus 104. The power conversion unit 105 can be configured to adjust the voltage level of power received from the computing device 100 to the voltage level required for components (e.g. analysis and/or charging components) of the data storage device.

Alternately, the power conversion unit 105 may be omitted. This may simplify the structure of the data storage device 131 in cases where the power received through the external interface bus 104 is at a suitable voltage level for the components of the data storage device 131.

In the example illustrated, the output 110 of the power conversion unit 105 can be connected to the super-capacitor 123. The power output from the power conversion unit 105 may be used to charge the super-capacitor 123.

An element of unidirectional conductivity can be coupled to the super-capacitor 123. As shown, a diode 112 has a first terminal 111 (anode) coupled to the output 110 of the power conversion unit 105 and a second terminal 113 (cathode) coupled to the super-capacitor 123. The second terminal 113 can be connected to an ungrounded (i.e. positive) terminal 115 of the super-capacitor 123. The power conversion block 105 and diode 112 can provide a charging circuit for the super-capacitor 123. This charging circuit can re-charge the super-capacitor using power received from the computing device 100 via external interface bus 104.

Alternately, or in addition, the data store device 131 may include a separate electrical interface usable to charge the super-capacitor 123. The electrical interface may be connected directly to the main power source 102 and/or another external power supply. The data storage device 131 may then re-charged the super-capacitor 123 using power received through the electrical interface.

The super-capacitor 123 can be connected to the data control unit (e.g. to control unit 116 as shown) by a power control unit 118. The super-capacitor 123 can provide power to the control unit 116 via the power control unit 118. As shown, the ungrounded terminal 115 of the super-capacitor 123 (and the second terminal 113 of the diode 112) can be coupled to an input 117 of the power control unit 118. The output 119 of the power control unit 118 can be coupled to a power supply input 120 of the control unit 116.

The power control unit 118 can include circuitry configured to adjust the level of power received from the super-capacitor 123 to the level required for operation of the control unit 116. For example, the power control unit 118 may be configured to adjust the voltage level of the power received from the super-capacitor 123 to ensure that the control unit 116 receives power at a substantially consistent voltage level (e.g. regardless of the charge state of the super-capacitor 123). The adjusted power can then be provided from the output port 119 to the power supply input 120 of the control unit 116. An example configuration of the power control unit 118 is described in further detail herein below with reference to FIGS. 2a and 2b.

In operation, the data control unit (e.g. data control components of control unit 116) can also receive data from the computing device 100. In the example shown, a data interface port 107 of the control unit 116 can be connected to the external interface bus 104 to receive data from the computing device 100. The computing device 100 may transmit system status data and/or diagnostic data to the control unit 116 via the external interface bus 104 (i.e. when the external interface bus 104 is connected to interface port 103).

In the example shown, the data interface port 107 is connected to the external interface bus 104 by an interface conversion unit 106. The interface conversion unit 106 can be configured to adjust the form of the signals received from the external interface bus 104 to a form compatible with the data interface port 107.

In some examples, the external interface bus 104 may use a communication protocol that is different from the communication protocol used by the data interface port 107. For example, the external interface bus 104 may use a serial communication protocol (e.g. RS-232) and the data interface port 107 may use a parallel communication protocol or vice versa. The interface conversion unit 106 may then convert the data received from the external interface bus 104 into a communication protocol suitable for the data interface port 107.

Alternately or in addition, the interface conversion unit 106 may adjust the voltage level of the signals received from the external interface bus 104. This may ensure that the signal levels are appropriate for the data interface port 107.

For example, the external interface bus 104 may communicate using an RS-232 serial interface while the data interface port 107 uses the same serial interface, but only with TTL level inputs. The interface conversion unit 106 may then provide only voltage level conversion between the external interface bus 104 and the data interface port 107.

Alternately, the interface conversion unit 106 may be omitted, for example where the external interface bus 104 and the data interface port 107 can be directly connected (e.g. without adjusting the communication protocol and/or voltage levels).

The data control unit can operate in a number of different operational states. The plurality of operational states can include a backup state and an inactive state. The operational state of the data control unit may be controlled based on the power level of the computing device 100 (e.g. whether the computing device is powered or not) and/or the stored power in the energy storage module (e.g. the charge state of the at least one super-capacitor 123).

In the backup state, the data control unit can operate to store backup data received from the computing device 100 in the non-volatile memory using power from the at least one super-capacitor 123. The data control unit can receive the backup data from the computing device 100 via the interface bus 104 when the interface bus 104 is connected to the computing device 100.

In the inactive state, the data control unit does not receive power from the at least one super-capacitor 123. For example, the control unit 116 may be connected to the super-capacitor 123 by a switch. The switch may be toggled to disconnect the control unit 116 from the super-capacitor 123 when the data control unit is adjusted to the inactive state.

The data storage device 131 can include a state control unit that is operable to control the operational state of the data control unit. The state control unit can monitor the stored voltage level of the at least one super-capacitor 123 (also referred to as "$V_{in}$"). The state control unit can also monitor the device power level (also referred to as "$V_{out}$") of the computing device 100 based on power level signal received from the interface bus 104. The state control unit can use the stored voltage level and the device power level to identify state transitions for the data control unit. The state control unit can then adjust the operation state of the data control unit when a state transition is identified.

In the example shown, the state control unit can be provided by a voltage detector 108, the power control unit 118 and components of the control unit 116 (e.g. components of the microcontroller and/or specialized hardware components).

The power control unit 118 can be configured to monitor a stored voltage level of the super-capacitor 123. The stored voltage level may indicate how long the control unit 116 can be powered by the super-capacitor 123 alone, e.g. if main power supply 102 fails or is disconnected. The stored voltage level may be determined based on the voltage level detected at the input 117 of the power control unit 118.

The voltage detector 108 may be configured to monitor the device power level of the computing device 100. The voltage detector 108 can be configured to detect a power off event of the main power supply 102 using signals received from the external interface bus 104. The device power level may be determined based on the voltage level detected at the input 110 of the voltage detector 108.

The voltage detector 108 can be electrically coupled to the external interface bus 104. Optionally, the voltage detector 108 may be connected to the external interface bus 104 via power conversion unit 105 as shown. The input of voltage detector 108 can be electrically connected to the output 110 of the power conversion unit 105.

The voltage detector 108 can be configured to monitor the voltage level of the signal or signals received from the external interface bus 104 to determine the device power level of the computing device 100. The voltage detector 108 may determine whether the voltage level of the received signals is greater or less than a power off threshold (also referred to as "$V_{down}$"). Determining that the voltage level of the received signal(s) is less than the power off threshold can indicate that the main power supply 102 has turned off and/or failed.

The output of the voltage detector 108 can be connected to a control input 109 of the control unit 116. The state control unit (e.g. components of control unit 116) can use the signals received at the control input 109 to adjust the operational state of the data control unit.

For example, voltage detector 108 can be configured to provide a power-off signal to the control input 109 in response to determining that the voltage level at the input of the voltage detector 108 is less than the power off threshold. In response to receiving a power-off signal at the control input 109, the operational state of the data control unit may be adjusted to the backup state.

As noted above, the power control unit 118 can be configured to monitor a stored voltage level of the super-capacitor 123. In some embodiments, prior to setting the operational state of the data control unit to the backup state, the stored voltage level of the super-capacitor 123 can be measured by the power control unit 118. The data control unit may only switch to the backup state in response to determining that the stored voltage level is greater than a backup voltage threshold (also referred to as "$V_{on}$").

The value selected for the backup voltage threshold may vary depending on the operating conditions of the system 130. The backup voltage threshold can vary based on the amount of data that the data storage device 131 needs to store in non-volatile memory and the power consumption of data storage device 131 in the backup state. The backup voltage threshold (and low voltage threshold) may be defined to ensure that the backup state is sufficiently long so that all backup data is stored in non-volatile memory by the data control unit.

The data control unit may continue to operate in the backup state while power is being provided to the control unit 116 by the super-capacitor 123. The state control unit may adjust the operational state of the data control unit from the backup state to the inactive state in response to determining that the stored voltage level is less than a low voltage threshold. For example, the power control unit 118 can be configured to disable the supply of power from the super-capacitor 123 to the control unit 116 when the voltage level at the input 117 of the power control unit 118 is less than the low voltage threshold (also referred to as $V_{off}$).

In some embodiments, the low voltage threshold can be defined to retain a predetermined amount of power in the super-capacitor 123 to permit the data control unit to perform various operations after the backup state has finished. For example, the predetermined amount of power may be selected to ensure that the data control unit can output data through an output unit for a predetermined period of time (e.g. enough time to transmit the backup data through an external interface and/or a reasonable time period for a user to view and understand output data displayed through a display device). This predetermined amount of power, and thus the value of the low voltage threshold, may vary based on the amount of backup data stored by data storage device 131 and the power consumption of the data control unit and output unit.

Additionally, the low voltage threshold can be defined at a predefined voltage difference from the backup voltage threshold. The separation between the backup voltage threshold and the low voltage threshold (i.e. the predefined voltage difference) can be set at a level that is greater than the level of dielectric absorption that super-capacitor 123 would experience at the low voltage threshold. That is, the predefined voltage difference is set to be greater than the voltage increase that would occur in the super-capacitor 123 due to dielectric absorption if the super-capacitor 123 was disconnected from a load when the stored voltage of the super-capacitor 123 is equal to the low voltage threshold.

This separation can ensure that the operation of the data control unit does not return to the backup state as a result of dielectric absorption. This may reduce the total amount of power discharged from the super-capacitor 123 before settling into the inactive state. The specific value of may vary depending on the specific super-capacitor used and the value of the discharge current, however in general the predefined voltage difference may typically be more than 10% of $V_{off}$.

In some embodiments, the predefined voltage difference between the low voltage threshold and the backup voltage threshold may be at least 20% of the low voltage threshold. In some cases, the predefined voltage difference may be greater than 30% of the low voltage threshold, for example 25%, 30% or even 35% or more of the low voltage threshold. This may ensure that the voltage gain due to dielectric absorption does not cause the control unit 116 to enter the backup state.

In some embodiments, both the backup voltage threshold and the low voltage threshold may be fixed. This may facilitate operation of the data storage device 131, while providing a reasonable length of backup state.

In some embodiments, one or both of the backup voltage threshold and the low voltage threshold may be adjustable. The backup voltage threshold and/or low voltage threshold may be adjusted based on the desired operating conditions of the data storage device 131, while ensuring that the predefined voltage difference between the backup voltage threshold and the low voltage threshold remains.

For example, the low voltage threshold may be decreased (i.e. adjusted to a lower voltage level) to increase the length of the backup state. This may provide more time for the data control unit to store diagnostic and/or status data in non-volatile storage elements in response to a power-off event.

Alternately, the low voltage threshold may be increased (i.e. adjusted to a higher voltage level). This may increase the amount of power that remains stored in the super-capacitor 123 after the data control unit has transitioned to the inactive state. This may provide additional power for the data control unit to output or otherwise transmit the data stored in non-volatile memory to an external system.

In some embodiments, the data control unit may have a data logging operational state. The state control unit can be configured to change the operational state of the data control unit to the data logging state in response to determining that the device power level is greater than the power off threshold. The voltage detector 108 may provide a power-on signal to the control input 109 in response to determining that the voltage level at the input of the voltage detector 108 is greater than the power-off threshold. The control unit 116 may adjust the operational state of the data control unit to the data logging state in response to the power-on signal being present at the control input 109.

In some embodiments, the state control unit may change the operational state of the data control unit to the data logging state in response to determining both that the device power level is greater than the power off threshold, and the stored voltage level is greater than backup voltage threshold. For example, the stored voltage level of the super-capacitor 123 can be measured by the power control unit 118. The power control unit 118 may provide power to the control unit 116 in response to determining that the stored voltage level is greater than a backup voltage threshold (also referred to as "$V_{on}$"). The control unit 116 may then evaluate the signal at the control input 109 and adjust the operational state of the data control unit to the data logging state in response to the power-on signal being present at the control input 109.

As noted above, in some embodiments, the data control unit may only switch to the backup state in response to determining that the stored voltage level is greater than a backup voltage threshold (also referred to as "$V_{on}$"). Alternately or in addition, the data control unit may switch to the backup state from the data logging state in response to determining that the device power level is less than the power off threshold. For instance, where the data control unit operates in the data logging state only after determining that the stored voltage level is greater than the backup voltage level, the data control unit may transition from the data logging state to the backup state without requiring the stored voltage level to be determined again (i.e. other than the initial determination that caused the data logging state to be initiated). This may ensure that the backup state begins immediately in response to determining that the device power level is less than the power off threshold.

In some embodiments, the data control unit may only switch to the backup state from the data logging state. This may ensure that the backup state is only initiated after the main computing system 100 has been operating and there is data to be backed-up. This may also avoid unnecessary backup operations, e.g. in cases where the data storage device 131 may be separately connectable to an external power source usable to charge the super-capacitor 123.

In some embodiments, the control unit 116 may adjust the operational state of the data control unit to the data logging state regardless of the charge stored by the super-capacitor 123. This may allow the data control unit to begin monitoring data from the computing device 100 even before the super-capacitor 123 is fully charged. The voltage at the input 117 to the power control unit 118 may increase above the backup voltage threshold in response to the supply of power from the main power supply 102 charging the super-capacitor 123, but before the super-capacitor 123 is fully or even close to fully charged.

In the data logging state, the data control unit can receive data from the computing device 100 via the interface bus 104. The data control unit can also monitor the received data on an ongoing basis.

In some cases, the data control unit may store some of the received data in the non-volatile storage elements of the data storage device 131 while operating in the data logging state. This may shorten the time required to back-up data in the event that computing device 100 loses power.

Alternately or in addition, the data control unit may store received data in a volatile storage element while in the data logging state. Some or all of this data may subsequently be transferred to a non-volatile storage element when data control unit operates in a backup state.

The data storage device 131 can also include an output unit 121. The output unit 121 can be connected to the data control unit. As shown, the output unit 121 can be connected to an I/O port 122 of the control unit 116. The output unit 121 can be used to provide output data corresponding to the backup data stored in the non-volatile storage elements of the data storage device 131.

The data control unit can operate using power from the super-capacitor 123 to provide data through the output unit 121. The backup state of the data control unit, and the low voltage threshold, can be defined to retain sufficient energy in the super-capacitor 123 to output data via the output unit 121.

In some embodiments, the output unit 121 can include an external interface port. The external interface port may be connectable to a data transmission connector such as a serial cable. The data transmission connector may be used to connect the external interface port to another external computing device that may be used to analyze the diagnostic data and/or system status data stored in the non-volatile storage memory of the data storage device.

The data control unit may operate using power from the super-capacitor 123 to retrieve data from the non-volatile storage memory and transmit the data through the external interface port. The data may then be displayed and reviewed on an external computing device coupled to the external interface port.

The external interface port may be configured to communicate using various different communication protocols. In some embodiments, the external interface port may communicate using a communication protocol that omits a dedicated power supply line (e.g. RS-232). The data control unit can use power from the super-capacitor 123 to power transmission through the external interface port. This may allow the system status and/or diagnostic data to be retrieved without having to activate the electronic system 100.

The external interface port may also be used to provide configuration data from an external system or device to the control unit 116. This may allow a user to adjust the operational settings of the control unit 116.

In some embodiments, the output unit may include a wireless communication unit. The wireless communication unit may be configured to communicate using various different wireless communication protocols, such as Wi-Fi or Bluetooth®. This may allow the data control unit to transmit data to an external system without having to provide a direct physical connection to the control unit 116.

Alternately or in addition, the output unit 121 can include an output display. For example, the output unit 121 may include an output display configured as a low power LCD panel or block of multiple low power LEDs. The data control unit can be configured to display output data on the output display using power supplied by the super-capacitor 123. This may provide a user with simple and accessible feedback on the status of the electronic system 100, even without connecting a separate device or system to the control unit 116.

The data control unit can operate in an output operational state to transmit data using the output unit 121. In the output state, the data control unit may operate to transmit output data through the output unit 121 using power from the super-capacitor 123. The output data can be defined using the backup data stored in the non-volatile memory. The format of the output data may vary depending on how the output data is being output, e.g. visually or through a connection to an external device/system.

The data control unit may be configured to transition to the output state from the inactive state. For example, the state control unit may receive an output activation signal while the data control unit is in the inactive state. The operational state of the data control unit may then be adjusted from the inactive state to the output state in response to receiving the output activation signal.

In some embodiments, the output activation signal may be received from a user input interface. The user input interface may receive a data output user input and then transmit the output activation signal to the state control unit in response to receiving the data output user input. For example, the data storage device 131 may include a button that a user can push in order to generate the data output user input. The data control unit may then be adjusted to the output state as a result of the user pushing the button.

Alternately or in addition, the output activation signal may be received from an external device or system that is connected to the control unit 116. For example, an external device may transmit an activation signal via the external interface port indicating that the output of data is requested. Alternately, the activation signal may be sent wirelessly to the control unit 116 through a wireless communication unit.

Figure 2A:
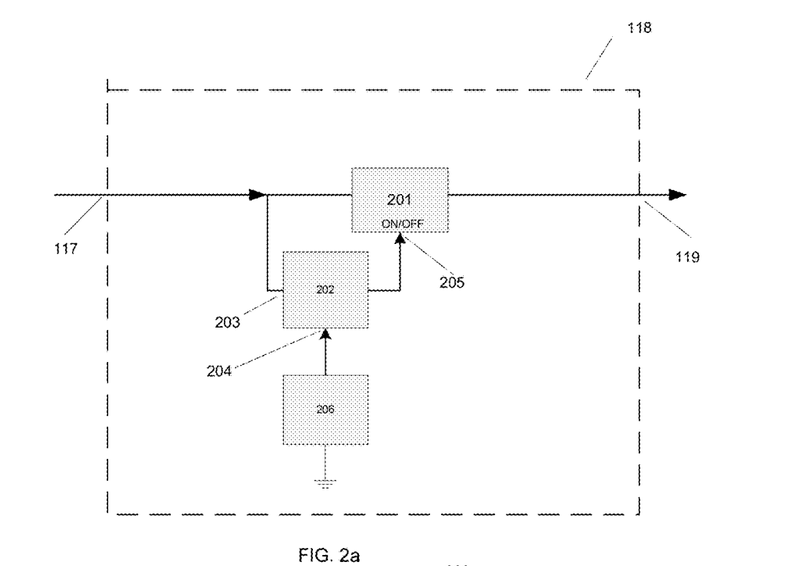
FIG. 2a is a block diagram of an example power control unit in accordance with an embodiment.

Referring now to FIG. 2a, shown therein is a block diagram illustrating an example configuration of the power control unit 118. The example power control unit 118 shown in FIG. 2a may be used in various embodiments of the data storage device 131.

As shown in FIG. 2a, power control unit 118 includes a power block 201, a voltage level analyzer block 202 and output enable block 206. The input port 117 of the power control unit 118 can be connected to the super-capacitor 123. Power from super-capacitor 123 can be routed to the power block 201.

Power block 201 can be configured to convert the incoming voltage level $V_{in}$ from super-capacitor 123 to the voltage level required for the normal operation of control unit 116. The output of power block 201 can be connected to output port 119. Output port 119, in turn, can be connected to the power supply input 120 of the control unit 116.

Operation of the power block 201 can be controlled by voltage level analyzer block 202. As shown, voltage level analyzer block 202 can be connected to a power on/off port 205 of the power block 201. The voltage level analyzer block 202 can provide power control signals to the power on/off port 205 to enable and disable the output of power from the power block 201. Disabling the supply of power from the power block 201 can cause the data control unit to transition to the inactive state.

As shown in FIG. 2a, power from the super-capacitor 123 can also be routed to an input port 203 of the voltage level analyzer 202. The voltage level analyzer 202 can operate using the power from the super-capacitor 123.

The voltage level analyzer 202 can monitor the voltage level ($V_{in}$) of the incoming power from the super-capacitor 123. The voltage level analyzer 202 can then determine the power control signals based on the value of $V_{in}$. Accordingly, the supply of power from the power block 201 to the data control unit (e.g. control unit 116) can be controlled based on the value of $V_{in}$.

The voltage level analyzer 202 can be configured to compare the incoming voltage level (yin) to two or more predetermined voltage thresholds. When the incoming voltage level increases above a first threshold level, referred to as the backup voltage threshold or $V_{on}$, the voltage level analyzer 202 can generate a power on signal. The power on signal can be provided to the power on/off port 205 to enable the supply of power from power block 201 to the data control unit (e.g. control unit 116). The data control unit may then begin operation in a data logging state (also referred to as a "normal state").

When the incoming voltage level decreases below a second threshold level, referred to as the low voltage threshold or $V_{off}$, the voltage level analyzer 202 can generate a power off signal. The power off signal can be provided to the power on/off port 205 to disable the supply of power from power block 201 to the control unit 116. The data control unit may then stop operation (i.e. the data control unit can transition to the inactive state).

The output enable block 206 can be used to activate the control unit 116 even after the voltage level analyzer 202 has disabled the supply of power from power block 201 to the control unit 116 (and without the incoming voltage level increasing back above the backup voltage threshold). This can allow the data control unit to transition to an output state from the inactive state.

The output enable block 206 can be connected to an override port 204 of the voltage level analyzer. The output enable block 206 can generate a power override signal and provide the power override signal to the override port 204. The power override signal can be used to override the power off signal from the voltage analyzer block 202.

Figure 2B:
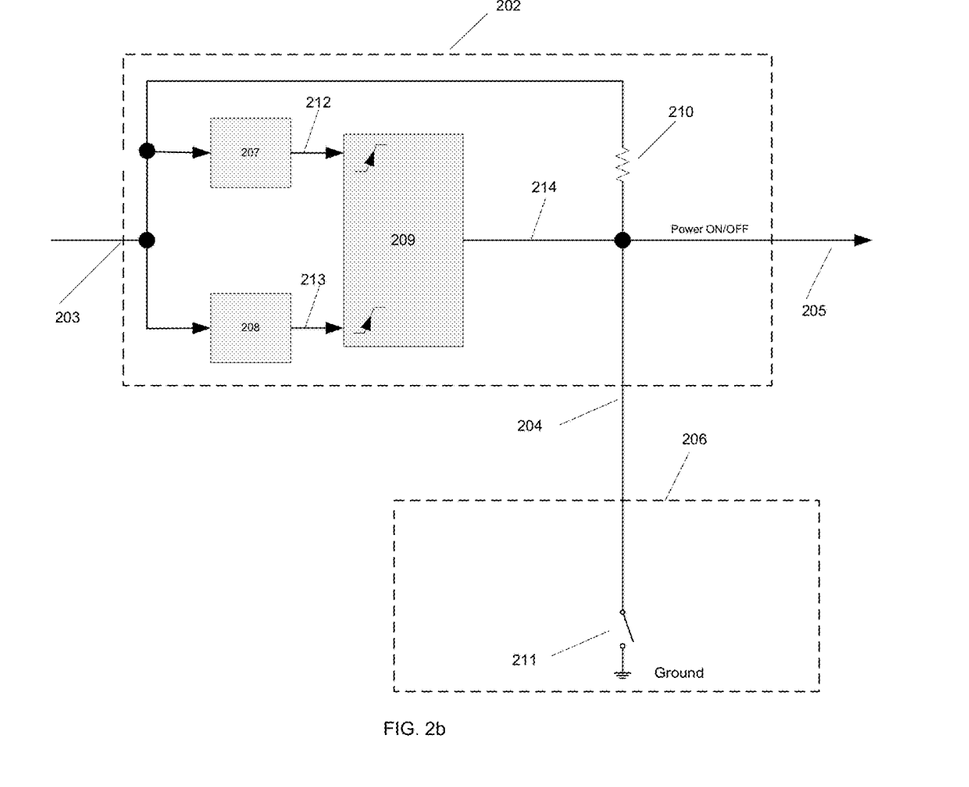
FIG. 2b is a block diagram of example power control sub-units that may be used in the power control unit of FIG. 2a in accordance with an embodiment.

FIG. 2b illustrates an example configuration of the voltage analyzer block 202 and the output enable block 206 in accordance with an embodiment.

In the example of FIG. 2b, the input port 203 of the voltage analyzer block 202 is coupled to a pair of voltage comparators 207 and 208. The input port 203 is also coupled to the first terminal of pull-up resistor 210. The second terminal of the pull-up resistor 210 is connected via port 204 to the open-drain signal 214 that connects the output from backup power controller 209 to the power on/off port 205 of the power block 201.

The incoming power $V_{in}$ from the super-capacitor 123 can be provided to voltage comparators 207/208 and pull-up resistor 210 via input port 203.

The first comparator 207 can be configured to compare the incoming voltage level $V_{in}$ from super-capacitor 123 with the backup voltage threshold $V_{on}$. When $V_{in}$ crosses the backup voltage threshold $V_{on}$ from low to high (i.e. crosses the backup voltage threshold while increasing as super-capacitor 123 charges) the first comparator 207 can generate an enable signal. The enable signal may be generated as an edge signal. The enable signal can be transmitted to the backup power controller 209 via enable line 212. In response to receiving the enable signal from comparator 207, the backup power controller 209 can switch to a power enable mode. In the power enable mode, the backup power controller 209 can adjust open-drain signal 214 to a low voltage level. The low voltage enable signal can be transmitted to the power on/off port 205 to enable the supply of power from power block 201 to the control unit 116.

The second comparator 208 can be configured to compare the incoming voltage level $V_{in}$ from super-capacitor 123 with the low voltage threshold $V_{off}$. When $V_{in}$ crosses the low voltage threshold $V_{off}$ from high to low (i.e. crosses the low voltage threshold while decreasing as super-capacitor 123 discharges) the second comparator 208 can generate a disable signal. The disable signal may be generated as an edge signal. The disable signal can be transmitted to the backup power controller 209 via enable line 213. In response to receiving the disable signal from comparator 208, the backup power controller 209 can switch to a power disable mode. In the power disable mode, the backup power controller 209 can adjust open-drain signal 214 to a high voltage level. The high voltage disable signal can be transmitted to the power on/off port 205 to disable the supply of power from power block 201 to the control unit 116. The backup power controller 209 may be in the power disable mode as the default mode.

In some embodiments, the voltage analyzer block 209 may be configured to change its mode (between power disable mode and power enable mode) only when the stored voltage level crosses the backup voltage threshold while increasing or when the stored voltage level cross the low voltage threshold while decreasing.

The output enable block 206 can be configured to activate the supply of power from the power block 201 to the data control unit while the stored voltage level $V_{in}$ of the super-capacitor 123 is still less than the backup voltage threshold $V_{on}$.

As shown in FIG. 2b, the output enable block 206 can be implemented as normal-open switch 211. One of the terminals of switch 211 can be connected to ground. The other terminal of switch 211 can be connected to the open-drain output signal 214 from backup power controller 209. When switch 211 is closed, the disable open-drain signal 214 from the backup power controller can be overwritten to an enable signal by pulling the voltage level of the open-drain signal 214 down. The enable signal can then be provided to the power block 201 via port 205 to enable the supply of power to control unit 116.

When the control unit 116 initially receives power, the state control components of control unit 116 can evaluate the signal at control input 109. If the voltage detector 108 indicates that $V_{out}$ is less than $V_{down}$, then the data control unit can transition to the output state. The data control unit can then access the backup data from non-volatile storage memory and output the backup data via output unit 121.

In the example shown, the output enable block 206 is configured as a switch. Alternately, the output enable block 206 may be configured to include a solar panel. The solar panel may generate a power enable signal when the solar panel detects light. For instance, the solar panel may be positioned within a housing of the data storage device 131. This may cause the data control unit to transition to the output state when the housing of the data storage device 131 is opened.

Figure 3:
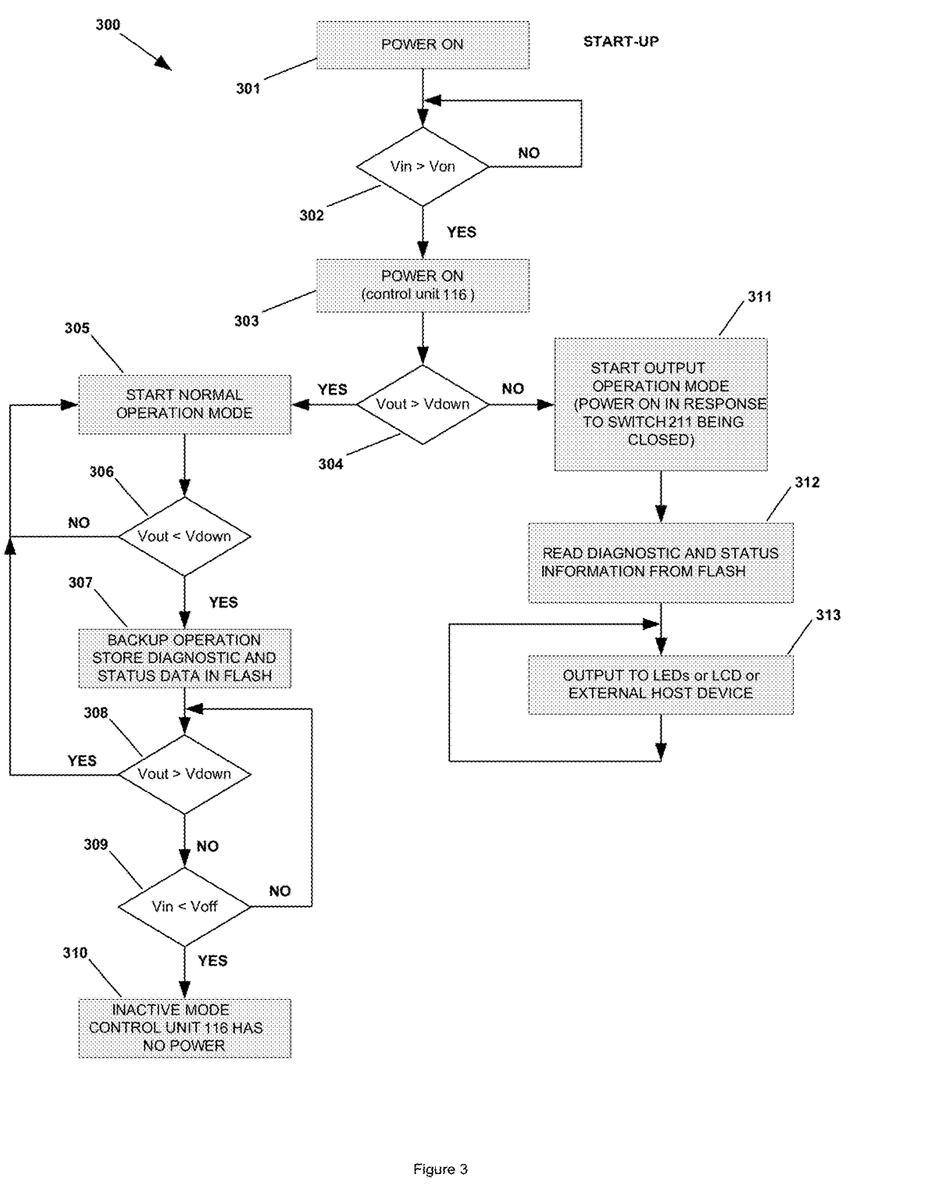
FIG. 3 is an example of a flow chart illustrating operations of the data backup system of FIG. 1 in accordance with an embodiment.

Referring now to FIG. 3, shown therein is a flowchart illustrating an example method of backing up data for a computing device that operates using power from a device power supply. As explained herein above, a data storage device can be connected to the computing device. The data storage device can include at least one super-capacitor, a data control unit coupled to the at least one super-capacitor and a non-volatile memory coupled to the control unit.

The data storage device can be configured to monitor a device power level of the computing device and to monitor a stored voltage level of the at least one super-capacitor. If the device power level is less than a power off threshold, and the stored voltage level is greater than a backup voltage threshold, then the data storage device can operate the data control unit using power from the at least one super-capacitor to store backup data received from the computing device in the non-volatile memory. If the stored voltage level is less than the low voltage threshold, the power supply from the at least one super-capacitor to the data control unit can be disabled.

Method 300 illustrates an example of the operations of data storage device 131 during a start-up mode, a normal operation mode (also referred to as a data logging state), and an indication operation mode (also referred to as an output state).

At 301, the main power supply 102 can be powered on and begin supplying power to system 100, including providing power to data storage device 131 via external interface bus 104. The power from the main power supply 102 can be used by the charging block (e.g. power conversion block 105 and diode 112) to begin charging super-capacitor 123. As super-capacitor 123 charges, the stored voltage level $V_{in}$ increases up to the super-capacitor maximum voltage ($V_{max}$) when the super-capacitor 123 is fully charged.

At 302, as the stored voltage level increases, the voltage level analyzer 202 can compare the stored voltage level to a backup voltage threshold. If the stored voltage level is less than the backup voltage threshold, the method remains at 302.

When the storage voltage level increases above the backup voltage threshold, the voltage level analyzer can provide an enable signal to power block 201 and method 300 can move to 303. In some embodiments, the voltage level analyzer may only provide the enable signal to power block 201 when the stored voltage level crosses the backup voltage threshold while increasing in voltage.

At 303, the power block 201 can provide power to the data control unit (e.g. control unit 116). The data control unit can then begin operation. Although not shown, as described below it is also possible to transition to block 303 in response to an override signal from the output enable block 206 causing the power control block 201 to provide power to control unit 116, even if the stored voltage level is less than the backup voltage threshold.

At 304, the control unit 116 can analyze the control input 109 received from voltage detector 108. The control unit 116 can compare the device power level received at the voltage detector 108 to a power off threshold. If the device power level is greater than the power off threshold, the control unit 116 can transition the data control unit to a data logging or normal operation mode at 305. If the device power level is less than the power off threshold, indicating that the supply of power from main power supply 102 is not active, the control unit 116 can transition the data control unit to the output operational mode at block 311.

At 305, the data storage device can operate in the data logging mode. In the data logging mode, the data control unit can collect diagnostic and status data from the electronic system 100 via interface bus 104. Optionally, the data storage device 131 may also provide output data through the output unit 121, such as displaying data using an LED or LCD display unit. During the data logging mode, the control unit 116 may continually monitor the device power level received from the voltage detector 108 via control input 109 as shown at block 306.

If the voltage detector 108 indicates that the device power level (as determined at the input to the voltage detector 108) is less than the power off threshold, the state control components of control unit 116 can adjust the data control unit to the backup operational state at 307. This may occur when the main power source 102 is turned off or there is a power failure. When in the backup state, the super-capacitor 123 can operate as the power source for the data control unit.

At 307, the data control unit can store the collected diagnostic and status information to non-volatile memory (e.g. flash memory) coupled to the data control unit, and in some cases provided on the same microcontroller. The data storage device 131 may be configured to minimize power consumption in the backup state by disabling the output unit 121 and all input/output operations until the diagnostic and status data is completed being stored.

The state control components of control unit 116 can also continue to monitor the device power level from the voltage detector 108 at 308. If the device power level is determined to be above the power-off threshold, the data control unit may again transition back to the normal operation mode at 305. In some embodiments, the data control unit may transition back to the normal operation mode at 305 only if the device power level is determined to be above the power-off threshold and the stored voltage level is greater than backup voltage threshold.

At 308, if the device power level remains below the power off threshold (i.e. main power supply 102 is still inactive), the stored voltage level of the super-capacitor 123 may continue to discharge until it reaches a low voltage threshold. When the voltage level analyzer block 202 determines at 309 that the stored voltage level is less than the low voltage threshold, the power block 201 can be disabled. As a result, the supply of power to the control unit 116 is disabled and the data control unit can adjust to the inactive state at 310.

As noted above, the data control unit may also transition to the output operational state at 311 when the power control block 201 supplies power to control unit 116. The transition to the output operational state can occur after the voltage level analyzer block 202 has disabled power block 201 in response to the stored power level of the super-capacitor 123 decreases below the low power threshold (moving from high to low), and the switch 211 of the output enable block 206 is closed. In the output operational mode, the super-capacitor 123 can continue to discharge even as the stored voltage level decreases below the low voltage threshold until it reaches a minimum voltage level ($V_{min}$). The minimum voltage level can be defined as the minimum voltage required for the control unit 116 to operate. Once the stored voltage level reaches the minimum voltage level, the data control unit can transition to the inactive state as the super-capacitor 123 may not be able to provide sufficient power to the control unit 116 for operation.

If the data control unit adjusts to the output operational state, at 311, the data control unit can access the backup data (e.g. diagnostic and status data) stored in the non-volatile memory at 312. The backup data can then be output at 313 by the data control unit using the output unit 121. For example, the backup data may be displayed on an output display provided by LEDs or an LCD panel. Alternately or in addition, the backup data can be transmitted to an external host device using an external interface port.

Figure 4:
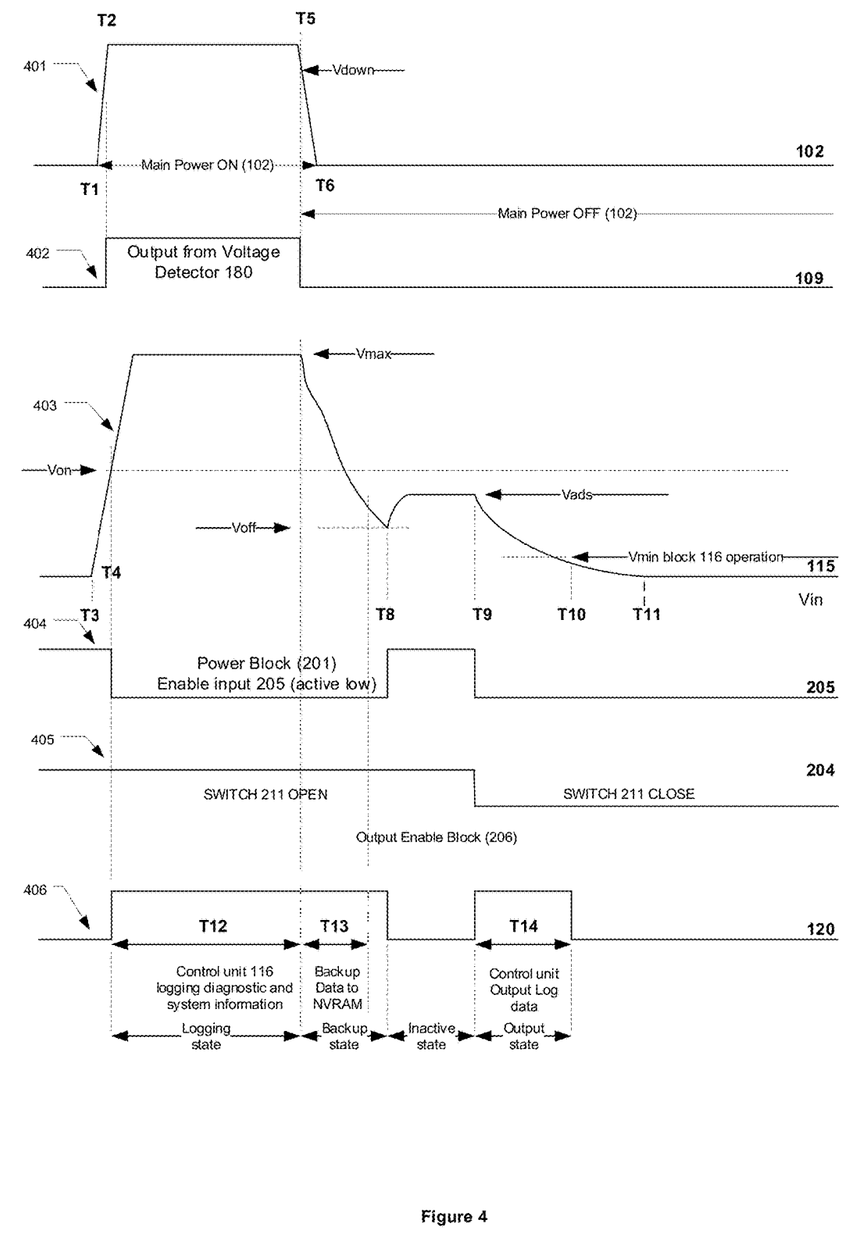
FIG. 4 illustrates various example voltage diagrams during operation of the data backup system of FIG. 1 in accordance with an embodiment.

Referring now to FIG. 4, shown therein are various examples of voltage diagrams 401-406 illustrating the voltage of various components of system 130 during the start-up, normal and output modes of operation of the data control unit. Voltage plot 401 illustrates the voltage of the power supplied by main power source 102 to system 130. Between times T1 and T2 the main power source 102 is turned ON and begins to supply power for the system 130. The voltage detector 108 can recognize this power on state and provide a power on signal to the control unit 116 via control input 109. Voltage plot 402 illustrates the control signal provided to control unit 109 by the voltage detector 108.

After power ON (time T1-T2) the voltage on the super-capacitor 123 begins to rise as the result of charging. Voltage plot 403 illustrates the voltage on the ungrounded terminal 115 of super-capacitor 123. When the stored voltage level of the super-capacitor 123 crosses the backup voltage threshold, moving from low to high voltage (at time T4) the voltage level analyzer block 202 switches to the power enable state and provides an enable power signal to the power control block 201 via port 205 to enable the supply of power to the control unit 116. The voltage on the port 205 is shown as voltage plot 404.

The power level of the super-capacitor 123 can continue to rise to $V_{max}$, at which point the super-capacitor 123 is fully charged. Voltage plot 406 illustrates the voltage at the power supply input 120 of the control unit 116 during a data logging mode, backup mode, inactive mode and output mode. The control unit 116 can operate in normal logging mode up to time T5 (see voltage plot 401) when main power supply 102 is deactivated.

The voltage detector 108 can identify this power shortage in the device power level and provide a control input via control port 109 to cause control unit 116 to transition to backup mode (since the stored voltage level in plot 403 is greater than $V_{on}$). The backup mode is shown on voltage plot 406. During the backup mode, the super-capacitor 123 supplies the power for the control unit 116 (see plots 403 and 404).

The super-capacitor 123 can continue to supply power to the control unit 116 until the voltage on the terminal 115 crosses the low threshold voltage (moving from high to low) at T8. The low voltage threshold can be defined to provide sufficient time (the time interval between T5 and T8) for the data control unit to save diagnostic and status data in non-volatile memory such as Flash (see interval T13 in plot 406).

As shown in voltage plot 404, the voltage analyzer block 202 can disable power block 201 by providing a disable output at T8 via port 205. As a result, the power supply to the control unit 116 can be disabled.

Figure 5:
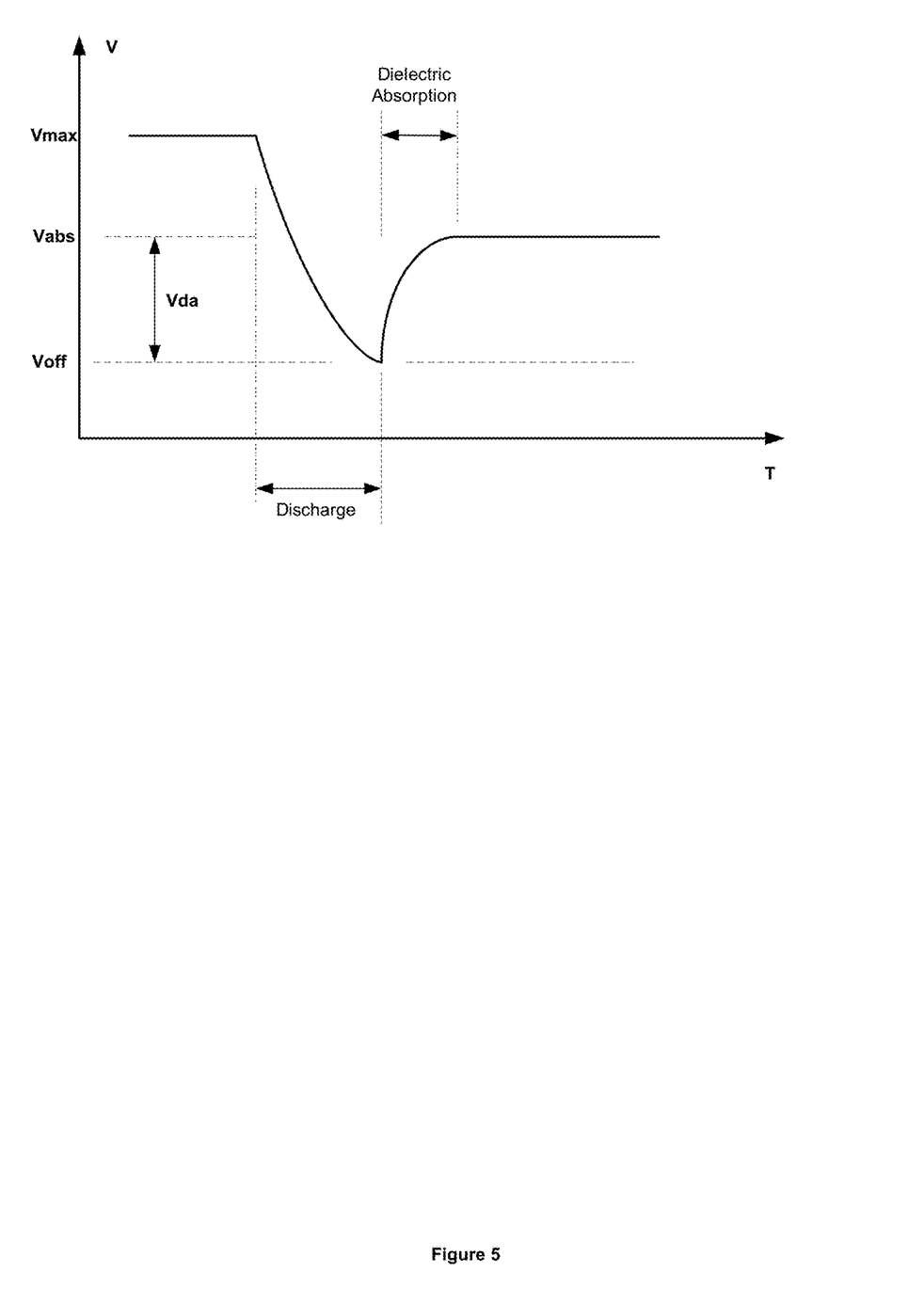
FIG. 5 illustrates an example plot of super-capacitor voltage during operation of the data backup system of FIG. 1 in accordance with an embodiment.

When the power block 201 disconnects the super-capacitor 123 from the control unit 116, the voltage on the terminal 115 of super-capacitor 123 will begin to rise after the discharge load is removed (i.e. power supply to the data control unit is disabled). This effect is referred to as Dielectric Absorption (see FIG. 5). The voltage on the terminal 115 will raise above the low voltage threshold to dielectric absorption voltage level $V_{ads}$. To ensure that the data control unit (e.g. control unit 116) is not toggled back on as a result of the dielectric absorption, the backup voltage threshold can be defined to be greater than the dielectric absorption voltage. This may avoid repeated activation of the control unit 116 and unnecessary discharging of the super-capacitor 123. In some embodiments, the backup voltage threshold may be greater than the dielectric absorption voltage by more than 20% of the low voltage threshold.

The disable signal from the voltage analyzer block 202 can be overridden using the output enable block 206. As shown in voltage plot 405, an output enable switch 211 can be used for the output enable block 206. At time T9, the switch 211 is closed and the output enable block 206 can override the disable signal from the voltage analyzer block 202 by adjusting the signal level at port 205 to the enable signal level. The super-capacitor 123 can then be connected to control unit 116 and the data control unit can be activated.

Because the main power supply is still off, the voltage detector 108 continues to provide a power off signal to the control input port 109. The state control components of the control unit 116 can transition the data control unit to the output state after detecting the power off signal. The data control unit can read the stored backup data and output the backup data using the output unit 121 (see interval T14 on plot 406).

While the data control unit continues to operate in the output mode, the voltage level on the terminal 115 of the super-capacitor 123 continues to decrease. The super-capacitor 123 can continue to decrease until the output mode is deactivated (e.g. due to a timeout or a deactivation signal from a user) or the stored voltage level reaches a minimum voltage (see T10 on the plot 403). When the super-capacitor 123 reaches the minimum voltage level, the data control unit can power down as there may be insufficient power available for the control unit 116 to operate.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A data storage device for a computing device, the computing device being powerable by a power source, the data storage device comprising:
   (a) at least one super-capacitor;
   (b) a data backup unit comprising:
      (i) a data control unit coupled to the at least one super-capacitor, wherein the data control unit is adjustable between a plurality of operational states, and the plurality of operational states include a backup state and an inactive state; and
      (ii) a non-volatile memory coupled to the data control unit;
   (c) an interface bus coupled to the data backup unit, wherein the interface bus is connectable to the computing device, wherein the power source of the computing device is separate from the at least one super-capacitor; and
   (d) a state control unit coupled to the at least one super-capacitor, to the data control unit, and to the interface bus, wherein the state control unit is operable to monitor a stored voltage level of the at least one super-capacitor, wherein when the interface bus is connected to the computing device the state control unit is operable to monitor a device power level of the computing device by monitoring a received power level from the interface bus, and the state control unit is operable to control the operational state of the data control unit based on the stored voltage level and the device power level;
   wherein
      in the backup state, the data control unit is operable to store backup data in the non-volatile memory using power from the at least one super-capacitor, wherein the backup data is received from the computing device via the interface bus when the interface bus is connected to the computing device;
      the state control unit is configured to set the operational state of the data control unit as the backup state in response to determining that the device power level is less than a power off threshold and that the stored voltage level is greater than a backup voltage threshold;
      the state control unit is configured to adjust the operational state of the data control unit from the backup state to the inactive state in response to determining that the stored voltage level is less than a low voltage threshold, wherein the low voltage threshold is less than the backup voltage threshold by a predefined voltage difference, and the predefined voltage difference is defined to be greater than the voltage gain of the at least one super-capacitor due to dielectric absorption when the stored voltage level is equal to the low voltage threshold and the at least one super-capacitor is decoupled from a load; and
      in the inactive state, the data control unit does not receive power from the at least one super-capacitor.

2. The data storage device of claim 1, further comprising:
   (a) an output unit coupled to the data control unit; wherein
      the data control unit is operable in an output state;
      in the output state, the data control unit is operable to transmit output data to the output unit using power from the at least one super-capacitor, wherein the output data is defined using the backup data stored in the non-volatile memory; and
      the state control unit is configured to:
         receive an output activation signal while the data control unit is in the inactive state; and
         change the operational state of the data control unit from the inactive state to the output state in response to receiving the output activation signal.

3. The data storage device of claim 2, wherein:
   the output unit comprises an external interface port and the external interface port is connectable to a corresponding data transmission connector.

4. The data storage device of claim 3, wherein:
   (a) the external interface port is configured according to a defined communication protocol;
   (b) the defined communication protocol omits a dedicated power supply line; and
   (c) the data control unit is configured to transmit the backup data through the external interface port using power from the at least one super-capacitor.

5. The data storage device of claim 2, wherein:
   (a) the output unit comprises an output display; and
   (b) the data control unit is configured to display the output data on the output display using power supplied by the at least one super-capacitor.

6. The data storage device of claim 2, further comprising:
   (a) a user input interface, wherein the user input interface is operable to:
      (i) receive a data output user input; and
      (ii) transmit the output activation signal to the state control unit in response to receiving the data output user input.

7. The data storage device of claim 1, wherein:
   (a) the data control unit is operable in a data logging state; and
   (b) when the interface bus is connected to the computing device
      (i) the state control unit is configured to change the operational state of the data control unit to the data logging state in response to determining that the device power level is greater than the power off threshold; and
      (ii) in the data logging state, the data control unit is operable to receive the backup data from the computing device via the interface bus and to monitor the received backup data.

8. The data storage device of claim 7, wherein the data control unit is powered by the at least one super-capacitor in the data logging state.

9. The data storage device of claim 1, wherein the predefined voltage difference is at least 20% of the low voltage threshold.

10. The data storage device of claim 1, wherein the backup voltage threshold is fixed and the low voltage threshold is fixed.

11. The data storage device of claim 1, wherein the backup voltage threshold is fixed.

12. The data storage device of claim 1, wherein when the interface bus is connected to the computing device, the at least one super-capacitor is chargeable using power from the power source.

13. A data backup system comprising:
(a) a computing device comprising:
  (i) a processor;
  (ii) a device memory coupled to the processor; and
  (iii) a device power supply, wherein the processor operates using power from the device power supply; and
(b) a data storage device comprising:
  (i) at least one super-capacitor;
  (ii) a data backup unit comprising:
    a data control unit coupled to the at least one super-capacitor, wherein the data control unit is adjustable between a plurality of operational states, and the plurality of operational states include a backup state and an inactive state; and
    a non-volatile memory coupled to the data control unit;
  (iii) an interface bus coupled to the data backup unit and to the computing device; and
  (iv) a state control unit coupled to the at least one super-capacitor, to the data control unit, and to the interface bus, wherein the state control unit is operable to monitor a stored voltage level of the at least one super-capacitor, the state control unit is operable to monitor a device power level of the computing device by monitoring a received power level from the interface bus, and the state control unit is operable to control the operational state of the data control unit based on the stored voltage level and the device power level;
  wherein
    in the backup state, the data control unit is operable to store backup data in the non-volatile memory using power from the at least one super-capacitor, wherein the backup data is received from the computing device via the interface bus when the interface bus is connected to the computing device;
    the state control unit is configured to set the operational state of the data control unit as the backup state in response to determining that the device power level is less than a power off threshold and that the stored voltage level is greater than a backup voltage threshold;
    the state control unit is configured to adjust the operational state of the data control unit from the backup state to the inactive state in response to determining that the stored voltage level is less than a low voltage threshold, wherein the low voltage threshold is less than the backup voltage threshold by a predefined voltage difference, and the predefined voltage difference is defined to be greater than the voltage gain of the at least one super-capacitor due to dielectric absorption when the stored voltage level is equal to the low voltage threshold and the at least one super-capacitor is decoupled from a load;
    in the inactive state, the data control unit does not receive power from the at least one super-capacitor.

14. The system of claim 13, wherein the data storage device further comprises:
(a) an output unit coupled to the data control unit;
  wherein
    the data control unit is operable in an output state;
    in the output state, the data control unit is operable to transmit output data to the output unit using power from the at least one super-capacitor, wherein the output data is defined using the backup data stored in the non-volatile memory; and
    the state control unit is configured to change the operational state of the data control unit from the inactive state to the output state in response to receiving an output activation signal.

15. A method of backing up data for a computing device that operates using power from a device power supply, the method performed by a data storage device, wherein the data storage device includes at least one super-capacitor, a data control unit coupled to the at least one super-capacitor and a non-volatile memory coupled to the data control unit, and wherein the data storage device is connected to the computing device, the method comprising:
(a) monitoring a device power level of the computing device;
(b) monitoring a stored voltage level of the at least one super-capacitor;
(c) if: (i) the device power level is less than a power off threshold, and (ii) the stored voltage level is greater than a backup voltage threshold, then operating the data control unit using power from the at least one super-capacitor to store backup data in the non-volatile memory, wherein the backup data is received from the computing device;
(d) if: (i) the stored voltage level is less than a low voltage threshold, wherein the low voltage threshold is less than the backup voltage threshold by a predefined voltage difference, and (ii) the predefined voltage difference is greater than the voltage gain of the at least one super-capacitor due to dielectric absorption when the stored voltage level is equal to the low voltage threshold and the at least one super-capacitor is decoupled from a load, then disabling power supply from the at least one super-capacitor to the data control unit.

16. The method of claim 15, further comprising:
(a) receiving an output activation signal while supplying power from the at least one super-capacitor to the data control unit is disabled; and
(b) in response to receiving the output activation signal:
  (i) enabling supplying power from the at least one super-capacitor to the data control unit; and
  (ii) operating the data control unit to transmit output data to an output unit, wherein the output data is defined using the backup data stored in the non-volatile memory.

17. The method of claim 16, wherein receiving the output activation signal comprises receiving a data output user input from a user input interface on the data storage device.

18. The method of claim 15, wherein:
(a) the output unit comprises an external interface port and the external interface port is connectable to a corresponding data transmission connector;
(b) the external interface port is configured according to a defined communication protocol, and the defined communication protocol omits a dedicated power supply line; and (c) transmitting the output data through the external interface port to the corresponding data transmission connector is powered by the at least one super-capacitor.

19. The method of claim 15, wherein transmitting the output data comprises:
   (a) displaying the output data on an output display of the data storage device using power from the at least one super-capacitor.

20. The method of claim 15, further comprising:
   (a) identifying a logging state transition by determining when the device power level is greater than the power off threshold; and
   (b) in response to identifying the logging state transition, operating the data control unit to monitor backup data received from the computing device.

21. The method of claim 20, wherein:
   (a) the data control unit is powered by the at least one super-capacitor while monitoring the backup data.

22. The method of claim 15, wherein the predefined voltage difference is at least 20% of the low voltage threshold.

23. The method of claim 15, wherein the backup voltage threshold is fixed and the low voltage threshold is fixed.

24. The method of claim 15, wherein the backup voltage threshold is fixed.

25. The method of claim 15, further comprising:
   (a) when the device power level is greater than the power off threshold, charging the at least one super-capacitor using power from the device power supply.

* * * * *